United States Patent
Tiirola et al.

(10) Patent No.: US 10,912,118 B2
(45) Date of Patent: Feb. 2, 2021

(54) LISTEN-BEFORE-TALK CHANNEL ACCESS

(71) Applicant: Nokia Technologies Oy, Espoo (FI)

(72) Inventors: Esa T. Tiirola, Kempele (FI); Timo E. Lunttila, Espoo (FI); Kari J. Hooli, Oulu (FI); Klaus Hugl, Vienna (AT)

(73) Assignee: NOKIA TECHNOLOGIES OY, Espoo (FI)

( * ) Notice: Subject to any disclaimer, the term of this patent is extended or adjusted under 35 U.S.C. 154(b) by 63 days.

(21) Appl. No.: 15/521,422

(22) PCT Filed: Nov. 7, 2014

(86) PCT No.: PCT/IB2014/065879
§ 371 (c)(1),
(2) Date: Apr. 24, 2017

(87) PCT Pub. No.: WO2016/071741
PCT Pub. Date: May 12, 2016

(65) Prior Publication Data
US 2017/0318607 A1    Nov. 2, 2017

(51) Int. Cl.
*H04W 76/45*    (2018.01)
*H04W 74/08*    (2009.01)
(Continued)

(52) U.S. Cl.
CPC ......... *H04W 74/0808* (2013.01); *H04W 4/10* (2013.01); *H04W 72/0446* (2013.01);
(Continued)

(58) Field of Classification Search
CPC ... H04W 4/10; H04W 52/14; H04W 72/0413; H04W 72/1268; H04W 72/12; H04W 76/45; H04L 65/4061
See application file for complete search history.

(56) References Cited

U.S. PATENT DOCUMENTS 8,830,947 B2    9/2014  Turtinen et al.
8,867,521 B2   10/2014  Hakola et al.
(Continued)

FOREIGN PATENT DOCUMENTS

CN    102648646 A    8/2012
EP    3 214 889 A2   9/2017
(Continued)

OTHER PUBLICATIONS

R1-144187, "Listen Before Talk and Channel Access", Oct. 6-10, 2014 (Year: 2014).*

(Continued)

*Primary Examiner* — Salvador E Rivas

(74) *Attorney, Agent, or Firm* — Squire Patton Boggs (US) LLP

(57) ABSTRACT

A method including transmitting from a base station (BS) at least one parameter for a first type of listen before talk (LBT) procedure to be used for uplink to be received by the base station; and configuring the base station (BS) for a different second type of listen before talk (LBT) procedure for downlink from the base station (BS). A method including receiving by a User Equipment (UE) at least one parameter for a first type of listen before talk (LBT) procedure; using the at least one parameter for uplink transmission from the User Equipment (UE); and receiving data on downlink to the User Equipment (UE) during a portion of a subframe, where the portion is less than an entire subframe.

20 Claims, 9 Drawing Sheets

(51) Int. Cl.
  H04W 4/10 (2009.01)
  H04W 72/12 (2009.01)
  H04W 72/04 (2009.01)
  H04L 5/00 (2006.01)

(52) U.S. Cl.
  CPC ........... *H04W 72/12* (2013.01); *H04W 76/45* (2018.02); *H04L 5/00* (2013.01)

(56) References Cited

U.S. PATENT DOCUMENTS

| | | | |
|---|---|---|---|
| 2008/0002734 A1* | 1/2008 | Zheng | H04B 7/2606 370/445 |
| 2013/0070642 A1* | 3/2013 | Kim | H04W 72/0413 370/254 |
| 2013/0208587 A1* | 8/2013 | Bala | H04W 72/0446 370/230 |
| 2015/0029910 A1* | 1/2015 | He | H01Q 1/243 370/280 |
| 2015/0071060 A1* | 3/2015 | Bhushan | H04L 5/0091 370/230 |
| 2016/0095018 A1* | 3/2016 | Vajapeyam | H04W 28/0278 370/331 |
| 2016/0205680 A1* | 7/2016 | Nguyen | H04L 5/14 370/280 |
| 2017/0339588 A1* | 11/2017 | Moon | H04W 24/08 |
| 2018/0255578 A1* | 9/2018 | Kim | H04W 74/0833 |

FOREIGN PATENT DOCUMENTS

| | | |
|---|---|---|
| GB | 2497780 | 6/2013 |
| WO | 2013112983 | 8/2013 |
| WO | 2015/169359 A1 | 11/2015 |
| WO | 2015/169397 A1 | 11/2015 |
| WO | 2016/046607 A1 | 3/2016 |

OTHER PUBLICATIONS

"Study on Licensed-Assisted Access using LTE", 3GPP TSG-RAN meeting #65, RP-141646, Agenda: 14.1.1, Ericsson, Sep. 9-12, 2014, 8 Pages.

"Broadband Radio Access Networks (BRAN); 5 GHz high performance RLAN; Harmonized EN covering the essential requirements of article 3.2 of the R&TTE Directive", Draft ETSI EN 301 893, V1.7.2, Jul. 2014, pp. 1-95.

"Review of Regulatory Requirements for Unlicensed Spectrum", 3GPP TSG-RAN meeting #63, RP-140054, Agenda: 14.2, Alcatel-Lucent, Mar. 3-6, 2014, pp. 1-16.

"Potential Solutions for LAA-LTE Design", 3GPP TSG-RAN Working Group 1 meeting #78bis, R1-143726, Agenda: 7.3.2.3, Huawei, Oct. 6-10, 2014, 5 Pages.

"Channel Access Mechanisms According to ETSI Regulations", 3GPP TSG RAN WG1 Meeting #78bis, R1-144183, Agenda: 7.3.2.1, Nokia Corporation, Oct. 6-10, 2014, 5 Pages.

"3rd Generation Partnership Project; Technical Specification Group Radio Access Network; Evolved Universal Terrestrial Radio Access (E-UTRA); Physical layer procedures (Release 12)", 3GPP TS 36.213, V12.3.0, Sep. 2014, pp. 1-212.

Tentative Rejection received for corresponding Taiwan Patent Application No. 104136701, dated Oct. 19, 2016, 15 pages of Tentative Rejection and 5 pages of translation available.

International Search Report and Written Opinion received for corresponding Patent Cooperation Treaty Application No. PCT/IB2014/065879, dated Jul. 7, 2015, 9 pages.

Nokia Networks et al. "Listen Before talk and Channel Access", 3GPP Draft; R1-144187, 3rd Generation Partnership Project (3GPP), Mobile Competence Centre; 650 Route Des Lucioles; F-06921 Sophia-Antipolis Cedex; France, vol. RAN WG1, No. Ljublana Slovenia, Oct. 6, 2014-Oct. 10, 2014 Oct. 5, 2014.

Office Action received for corresponding European Patent Application No. 14808725.7, dated Aug. 10, 2018, 9 pages.

Communication pursuant to Article 94(3) EPC issued in corresponding European Patent Application No. 14808725.7, dated May 28, 2019.

European Office Action corresponding to EP Application No. 14 808 725.7, dated Oct. 14, 2019.

Chinese Office Action corresponding to CN Appln. No. 201480083247.2, dated Sep. 4, 2019.

Notification of Second Office Action dated Feb. 19, 2020 corresponding to Chinese Patent Application No. 2014800832472, and English translation thereof.

May 28, 2020 Third Office Action issued in Chinese Patent Application No. 201480083247.2 with English Summary.

\* cited by examiner

LISTEN-BEFORE-TALK CHANNEL ACCESS

RELATED APPLICATION

This application was originally filed as PCT Application No. PCT/IB2014/065879 filed Nov. 7, 2014.

BACKGROUND

Technical Field

The exemplary and non-limiting embodiments relate generally to wireless communications and, more particularly, to radio communications.

Brief Description of Prior Developments

Listen Before Talk (LBT) (or sometimes called Listen Before Transmit or Carrier Sensing) is a technique used whereby a radio transmitter first senses its radio environment before it starts a transmission. LBT can be used by a radio device to find a free radio channel or resource to operate on.

SUMMARY

The following summary is merely intended to be exemplary. The summary is not intended to limit the scope of the claims.

In accordance with one aspect, an example method comprises transmitting from a base station (BS) at least one parameter for a first type of listen before talk (LBT) procedure to be used for uplink to be received by the base station; and configuring the base station (BS) for a different second type of listen before talk (LBT) procedure for downlink from the base station (BS).

In accordance with another aspect, an example embodiment is provided in an apparatus comprising at least one processor; and at least one non-transitory memory including computer program code, the at least one memory and the computer program code configured to, with the at least one processor, cause the apparatus to: transmit from the apparatus at least one parameter for a first type of listen before talk (LBT) procedure to be used for uplink to be received by the apparatus; and configure the apparatus for a different second type of listen before talk (LBT) procedure for downlink from the apparatus.

In accordance with another aspect, an example embodiment is provided in a non-transitory program storage device readable by a machine, tangibly embodying a program of instructions executable by the machine for performing operations, the operations comprising: transmitting from a base station (BS) at least one parameter for a first type of listen before talk (LBT) procedure to be used for uplink to be received by the base station (BS); and configuring the base station (BS) for a different second type of listen before talk (LBT) procedure for downlink from the base station (BS).

In accordance with another aspect, an example method comprises receiving by a User Equipment (UE) at least one parameter for a first type of listen before talk (LBT) procedure; using the at least one parameter for uplink transmission from the User Equipment (UE); and receiving data on downlink to the User Equipment (UE) during a portion of a subframe, where the portion is less than an entire subframe.

In accordance with another aspect, an example embodiment is provided in an apparatus comprising at least one processor; and at least one non-transitory memory including computer program code, the at least one memory and the computer program code configured to, with the at least one processor, cause the apparatus to: receive by the apparatus at least one parameter for a first type of listen before talk (LBT) procedure; use the at least one parameter for uplink transmission from the apparatus; and receive data on downlink to the apparatus during a portion of a subframe, where the portion is less than an entire subframe.

In accordance with another aspect, an example embodiment is provided in a non-transitory program storage device readable by a machine, tangibly embodying a program of instructions executable by the machine for performing operations, the operations comprising: receiving by a User Equipment (UE) at least one parameter for a first type of listen before talk (LBT) procedure; using the at least one parameter for uplink transmission from the User Equipment (UE); and receiving data on downlink to the User Equipment (UE) during a portion of a subframe, where the portion is less than an entire subframe.

In accordance with another aspect, an example embodiment is provided in an apparatus comprising means for transmitting from an apparatus at least one parameter for a first type of listen before talk (LBT) procedure to be used for uplink to be received by the apparatus; and means for configuring the apparatus for a different second type of listen before talk (LBT) procedure for downlink from the apparatus.

In accordance with another aspect, an example embodiment is provided in an apparatus comprising means for receiving by the apparatus at least one parameter for a first type of listen before talk (LBT) procedure; means for using the at least one parameter for uplink transmission from the apparatus; and means for receiving data on downlink to the apparatus during a portion of a subframe, where the portion is less than an entire subframe.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
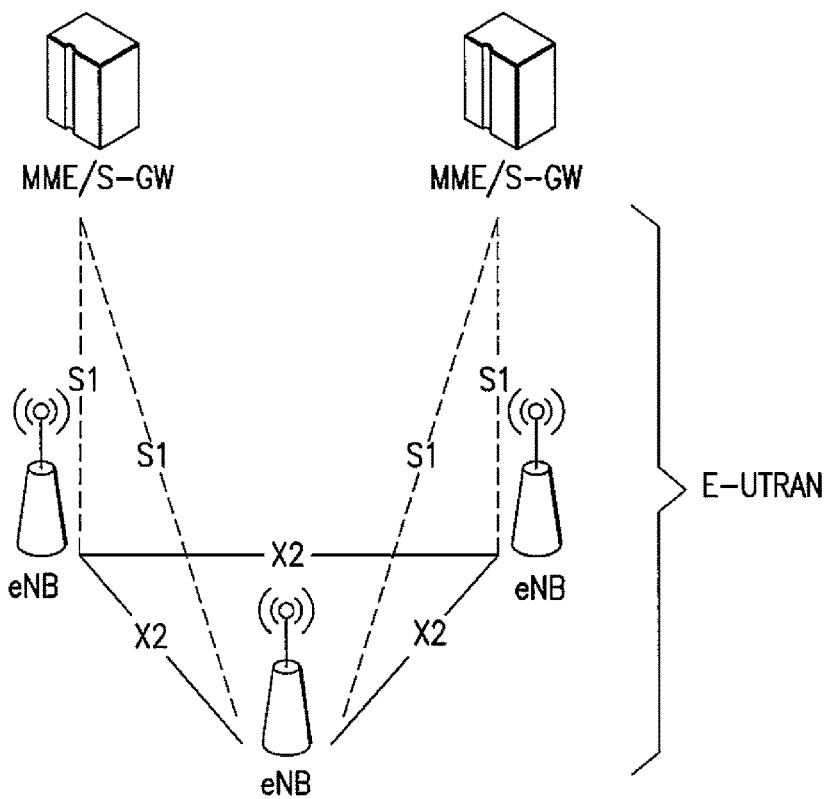
FIG. 1 is a diagram illustrating an example of an overall architecture of a E-UTRAN (evolved UMTS Terrestrial Radio Access) system (an air interface of 3GPP's Long Term Evolution (LTE) upgrade path for mobile networks)

The following abbreviations that may be found in the specification and/or the drawing figures are defined as follows:
3GPP Third Generation Partnership Program
AP Access Point
BB Baseband
CC Component Carrier
CCA Clear Channel Assignment
CRC Cyclic Redundancy Check
CRS Cell Specific Reference Signal
CRW Channel Reservation Window
CSI Channel State Information
CSI-RS Channel State Information Reference Signal
CSS Common Search Space
DCI Downlink Control Information
DL Downlink
DMRS Demodulation Reference Signal
DS Discovery Signal
DTX Discontinuous Transmission
DwPTS Downlink Pilot Time Slot
e.i.r.p. equivalent isotropically radiated power
eIMTA Enhanced Interference Mitigation and Traffic Adaptation (the name of the 3GPP WI targeting to flexible UL/DL adaptation for TD-LTE)
eNB/eNodeB enhanced Node B (base station according to LTE terminology)
EPC Enhanced Packet Core
EPDCCH Enhanced PDCCH
ETSI European Telecommunications Standards Institute
FDD Frequency Division Duplex
GP Guard Period
ID Identity
ISM Industrial, Scientific and Medical
LAA License-Assisted Access
LBT Listen Before Talk
LTE Long Term Evolution
NCT New Carrier Type
OFDM Orthogonal Frequency Division Multiplexing
OFDMA Orthogonal Frequency Division Multiple Access
PCell Primary Cell
PDCCH Physical Downlink Control CHannel
PDSCH Physical Downlink Shared CHannel
PLMN Public Land Mobile Network
PRB Physical Resource Block
PSS Primary Synchronization Signal
RAN Radio Access Network
Rel Release
RNTI Radio Network Temporary Identifier
RRM Radio Resource Management
SCell Secondary Cell
SCS Short Control Signalling
SSS Secondary Synchronization Signal
SDL Supplemental DL
TB Transport Block
TD/TDD Time Division duplex
TL Threshold Level
UE User Equipment
UL Uplink
UpPTS Uplink Pilot Time Slot
X2 X2 is an interface used to communication between eNBs FIG. 1 shows an example of overall architecture of an E-UTRAN system. The E-UTRAN system includes eNBs, providing an E-UTRAN user plane (PDCP/RLC/MAC/PHY) and control plane (RRC) protocol terminations towards the UE (not shown in FIG. 1). The eNBs are interconnected with each other by means of an X2 interface. The eNBs are also connected by means of a S1 interface to an EPC (Enhanced Packet Core), more specifically to a MME (Mobility Management Entity) by means of a S1 MME interface and to a Serving Gateway (S-GW) by means of a S1 interface. The S1 interface supports a many-to-many relationship between MMEs/S-GW and eNBs.

Figure 2:
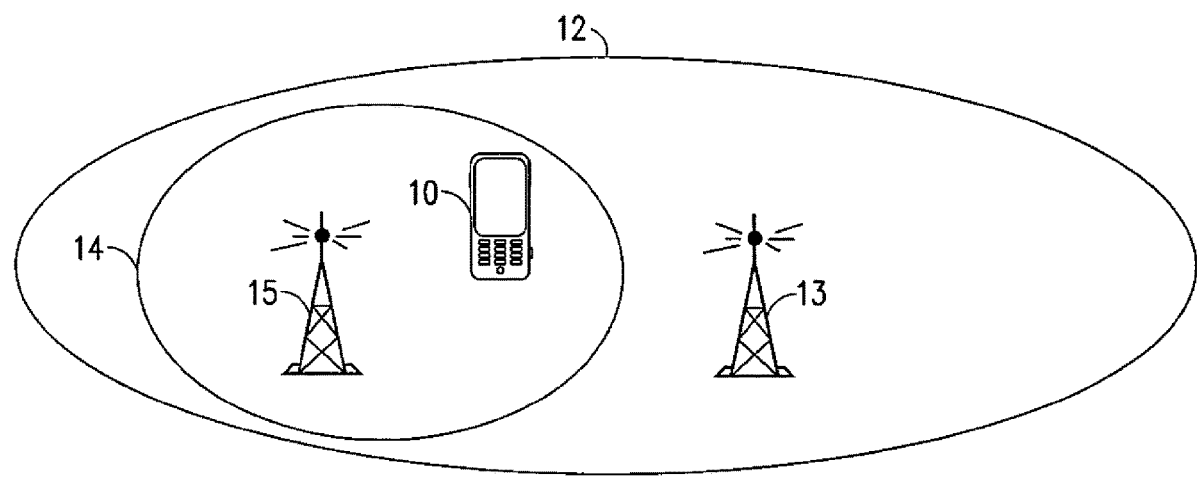
FIG. 2 is a diagram illustrating an example of a User Equipment (UE) in partially overlapping cells.

Referring also to FIG. 2, a UE 10 may be connected to more than one cell at a same time. In this example the UE 10 is connected to a PCell 12 through a base station 13 (such as an eNB for example) and a SCell 14 through a base station 15 (such as an eNB or WiFi Access Point for example). The two cells 12, 14 are, thus, at least partially overlapping. The PCell 12 may operate on a licensed band and the SCell 14 may operate on an unlicensed band, such as ISM bands. In certain scenarios of the invention, the Scell may operate also on licensed band(s). However, also in this case SCell usage may be subject to Listen Before Talk. The PCell may be either a FDD cell or TDD cell for example. For simplicity, there are just one PCell and one SCell depicted in the scenario shown in FIG. 2. In other alternate examples any number of cells (PCell and SCell) operating on licensed and/or unlicensed band(s) may be provided to work together for a suitable Carrier Aggregation (CA). In one type of example embodiment the PCell and SCell may be co-located.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Features as described herein may be used in relation to an LTE-Advanced system. More specifically, features as described herein may be used on LTE operation in an unlicensed spectrum also known as Licensed-Assisted Access (LAA). The LTE LAA operation may be based on LTE Carrier Aggregation (CA). Thus, a CA primary cell (PCell) may remain on a licensed band while a secondary cell (SCell) may be on an unlicensed spectrum. Licensed-Assisted Carrier Aggregation operation may be used to aggregate a primary cell, which uses a licensed spectrum, with an at least partially overlapping secondary cell, which uses an unlicensed spectrum. In one type of example embodiment the carrier aggregation principle may assume LTE Rel-10/11/12 Carrier Aggregation scenario with co-located cells and/or non-collocated cells connected with (close to) ideal backhaul. Alternatively, in another type of example embodiment the carrier aggregation principle may assume Rel-12 Small Cell or Dual Connectivity scenario with non-collocated cells (unlicensed and licensed) and (close to) ideal or non-ideal backhaul between them. Use of the unlicensed spectrum may deliver information to opportunistically boost data rate. The secondary cell may be used for supplemental downlink capacity only, or both downlink and uplink capacity.

In conventional LTE LAA, before being permitted to transmit, a user or an access point (such as eNodeB) may, depending on the regulatory requirements, need to monitor the given radio frequency for a short period of time to ensure the spectrum is not already occupied by some other transmission (referred to as List-Before-talk (LBT)). The requirements for LBT vary depending on the geographic region. For example in the US such requirements do not exist, whereas in Europe the network elements operating on unlicensed bands need to comply with LBT requirements. In one example, the LTE LAA may apply a listen before talk (LBT) procedure, such as based on European regulatory rules defined for 5 GHz ISM band. It may also fulfill other regulatory rules applying a LBT procedure, such as regional regulatory rules for example.

Different regions have different regulatory requirements for unlicensed band operation. For example, 3GPP TDoc RP-140054 ("Review of Regulatory Requirements for Unlicensed Spectrum") summarizes some of these different regulatory requirements for unlicensed band operation. Despite the regulatory rules, LTE has not yet been deployed in an unlicensed spectrum.

In Europe, for example, regulations mandate the equipment operating on unlicensed spectrum to implement LBT by performing Clear Channel Assessment (CCA) before starting a transmission; to verify that the operating channel is not occupied. ETSI document EN 301 893 defines European regulatory requirements unlicensed band on 5 GHz band. It defines two of modes of operation: Frame Based Equipment (FBE), and Load Based Equipment (LBE). The key properties and the differences between these options can be summarized as described below.

Frame Based Equipment (FBE)

Frame based equipment is the equipment where the transmit/receive structure is not directly demand-driven, but has fixed timing. The corresponding European regulatory rules are defined in ETSI document EN 301 893 and can be summarized as follows:

LBT/CCA is performed periodically at predefined time instances according to a predetermined frame structure:

The periodicity (Fixed Frame Period)=channel occupancy time+idle period

If the equipment finds the Operating Channel(s) to be clear, it may transmit immediately:
The total time during which equipment is allowed to have transmissions on a given channel without re-evaluating the availability of that channel, is defined as the Channel Occupancy Time.
If the equipment finds an Operating Channel occupied, it shall not transmit on that channel during the next Fixed Frame Period. FBE relies on a frame structure as given by frame based equipment operation might suit better the LTE frame thinking and the related carrier aggregation operation intended for LTE LAA. Operating FBE with a long fixed frame structure (e.g. 10 ms) might result in a low chance to find the channel unoccupied (low channel utilization) when co-existing with some LBE on the same carrier. The fixed frame structure and corresponding fixed UL/DL split of FBE might result in lower performance compared to operation based on demand (load)-driven dynamic UL/DL resource split that LBE could enable.

The fixed frame period consists of channel occupancy time (such as 1-10 ms for example) and idle period. The Idle period needs to be at least 5% of the channel occupancy time according to ETSI regulations. The device performs LBT periodically (the CCA has observation period) which lasts at least 20 μs (or at least 18 μs based on another specification version). If the equipment finds the Operating Channel(s) to be clear, it may transmit immediately. The total time during which equipment has transmissions on a given channel without re-evaluating the availability of that channel is defined as the Channel Occupancy Time. If the equipment finds an Operating Channel occupied, it shall not transmit on that channel during the next Fixed Frame Period. The periodic operation of FBE limits the opportunities to get the channel access.

Load Based Equipment (LBE)

Unlike for FBE, Load based equipment is not restricted to perform LBT/CCA according to a frame structure. Instead, LBE may perform LBT (CCA) whenever it has data to transmit. The key points can be summarized as follows:

Before a transmission (or a burst of transmissions) on an Operating Channel, the equipment performs a Clear Channel Assessment (CCA) check using "energy detect".

If the equipment finds the Operating Channel(s) to be clear, it may transmit immediately.

The total time that an equipment makes use of an Operating Channel is the Maximum Channel Occupancy Time which shall be less than $(13/32) \times q$ milliseconds, where $q=\{4 \ldots 32\}$. (For example, when $q=32$, the Maximum Channel Occupancy Time=13 milliseconds).

If the equipment finds an Operating Channel occupied, it does not transmit in that channel.

The equipment performs an Extended CCA check in which the Operating Channel(s) is/are observed for the duration of a random factor N multiplied by the CCA observation time.

N defines the number of clear idle slots resulting in a total Idle Period that need to be observed before initiation of the transmission.

The value of N is randomly selected in the range $1 \ldots q$ every time an Extended CCA is required and the value may be stored in a counter.

The counter is decremented every time a CCA slot is considered to be "unoccupied".

When the counter reaches zero, the equipment may transmit.

LBE might result in higher channel utilization compared to FBE in terms of co-existence with other systems. Interference coordination avoiding or mitigating potential cross-link interference might be hard to achieve with fully uncoordinated LBE operation. Carrier aggregation operation might be hard to operate with fully uncoordinated LBE operation having no timing relations with the licensed band PCell at all. The LBE method maximizes channel utilization in the sense that a device can utilize all transmission opportunities; not having to wait for the fixed frame period. On the other hand, having longer CCA periods and variable, effectively random transmission starting time have to be tolerated. Moreover, added flexibility in starting the transmissions may cause more complicated interference scenarios.

When comparing LBE and FBE approaches for LTE LAA, it can be noted that LBE is a good solution for DL:
It provides maximum opportunities for eNB to get the channel for DL operation
LBE allows to maximizes DL throughput and minimize the scheduling delays
It also provides fair coexistence (e.g. with WiFi).
On the other hand, UL scenario is quite different compared to DL. First of all, following the current LTE UL operation, the UE can transmit only with the permission of the eNB. In order to reuse features of LTE as much as possible this principle should be maintained also with LTE LAA. Another fact is that CCA must be synchronous between UEs multiplexed on the same UL resources. In an opposite case, the first UE would reserve the operating channel and the other UEs will see it as occupied. The third aspect is that FBE operation facilitates good interference coordination within LTE LAA network since it allows synchronizing UL transmissions also between neighboring cells.

In the example shown in FIG. 2, the SCell 14 may provide the LTE LAA carrier for the UE, where the UE is connected to the PCell 12 in the licensed spectrum. Features as described herein may be used to provide a new type of communication between a base station and a UE. This new communication system may comprise the base station (such as a eNB) being configured to transmit according to rules defined for Load Based Equipment (LBE), and the UE in the cell being configured to transmit according to rules defined for Frame Based Equipment (FBE). Features may be provided comprising:

LTE LAA Uplink operation should consider as a baseline ETSI rules defined for FBE, and/or LTE LAA Downlink operation should consider as a baseline ETSI rules defined for LBE.

Figure 3:
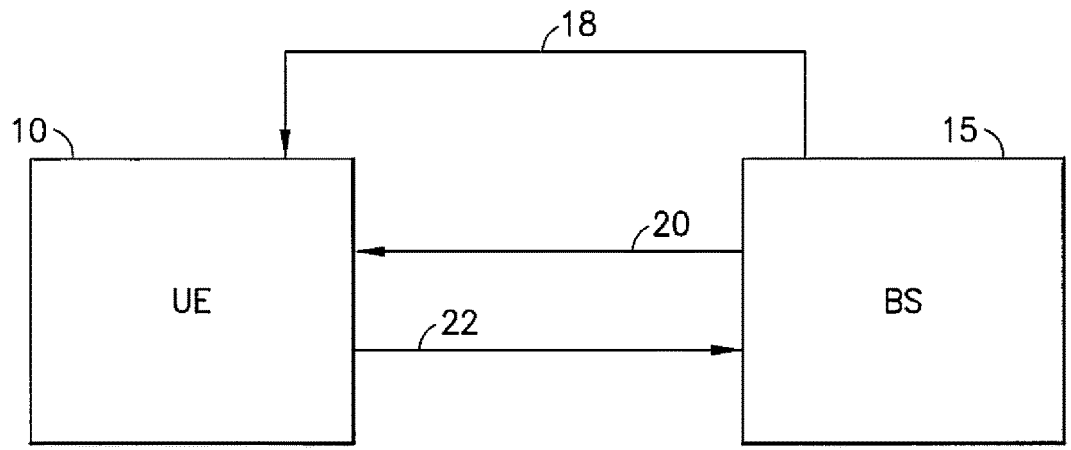
FIG. 3 is a diagram illustrating uplink and downlink between a base station (BS) and User Equipment (UE) shown in FIG. 2.

Referring also to FIG. 3, the UE 10 is shown with the base station 15 having a downlink 20 and an uplink 22 on SCell 14. The uplink 22 uses a first type of Listen Before Talk (LBT) procedure and the downlink 20 uses a different second type of Listen Before Talk (LBT) procedure. In this example the first type of Listen Before Talk (LET) procedure is a procedure that allows transmission to start when at least one channel is assessed to be unoccupied at at least one periodic time instance, such as a Frame Based Equipment (FBE) procedure for example, and the second type of Listen Before Talk (LBT) procedure is a procedure that allows transmission to start when at least one channel is assessed to be unoccupied at at least one time instance that is not periodic, such as a Load Based Equipment (LBE) procedure for example. However, in alternate example embodiments, other type of Listen Before Talk (LBT) procedure(s) might be used.

Downlink (DL) Operation

The base station 15 may try to get a channel (based on CCA/eCCA) in the cell 14 at any time according to rules defined for LBE. This may be further dependent on the scheduling decision of the base station 15 and of course the need for the eNB to transmit overall. In addition to normal DL subframes of a potential LAA frame structure, flexible subframes may be used for communication in either the UL or DL direction.

In addition to rules defined for LBE, the base station 15 may apply additional rules related to DL channel access such as, for example:

Certain subframes may be used as fixed DL subframes according to cell/area specific configuration defined for LTE LAA DL operation. The base station 15 can utilize those subframes for DL operation only.

Certain subframes may be used as fixed UL subframes according to cell/area specific configuration defined for LTE LAA UL operation. The base station 15 does not utilize those subframes in the DL side at all. The CCA/eCCA process of the base station 15 may or may not be suspended during the fixed UL subframes.

Certain subframe(s) may be used as a flexible subframe, which may be used as UL or DL subframes in certain cell/area defined for LTE LAA operation. Scheduling by the base station 15 may define whether those subframe(s) are used as DL or UL subframes. Flexible subframes may be therefore part of Channel Occupancy Time defined for UL or DL operation, depending on the base station's scheduling decision. If used for DL transmission, then it can be counted in the channel occupancy time for DL. The CCA/eCCA process of the base station 15 may or may not be suspended during flexible subframes scheduled as UL subframes in a given cell.

The base station 15 may signal one or more relevant parameters to the UE 10 in the cell 14 as indicate by signal 18 in FIG. 3. In one type of example embodiment the signal containing the parameter(s) may be transmitted to the UE 10 from the BS 13 by means of a channel in the PCell 12 (see FIG. 2). An example of such a parameter is a Fixed Frame Period (FFP) configuration. FFP configuration may define, for example, the UE's PDCCH blind detection (blind detection is needed for DL and flexible subframes) and the applied HARQ-ACK codebook size.

In this example, the DL operation 20 of the base station 15 follows LBE rules. Thus, the base station 15 may try to get access to a channel (based on CCA/eCCA) in the cell 14 at any time. The start of the transmission is flexible based on the outcome of the extended CCA (eCCA). The base station 15 defines the Maximum Channel Occupancy according to LBE rules. The Channel Occupancy Time (COT) may be defined and quantized according LTE resource units (subframes, DwPTS, OFDMA symbols, Guard Period, UpPTS, etc.) and according to configured UL operation.

Figure 4:
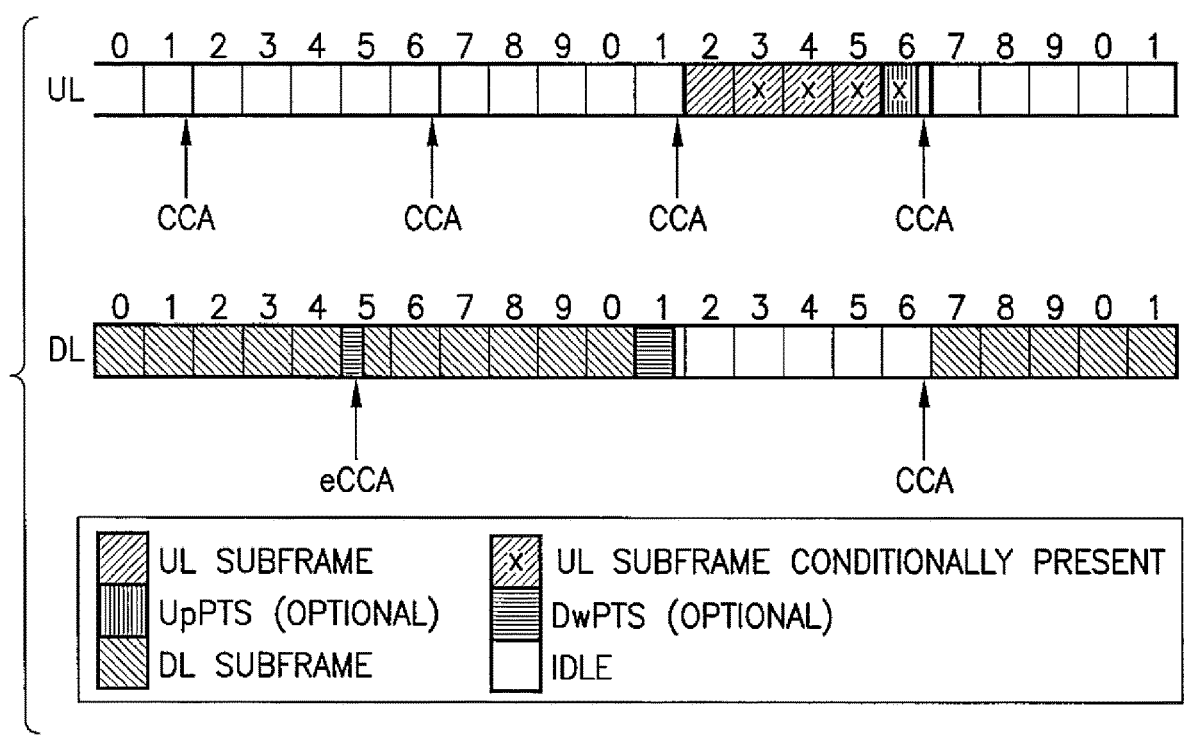
FIG. 4 is a diagram illustrating uplink and downlink subframes.
Figure 5:
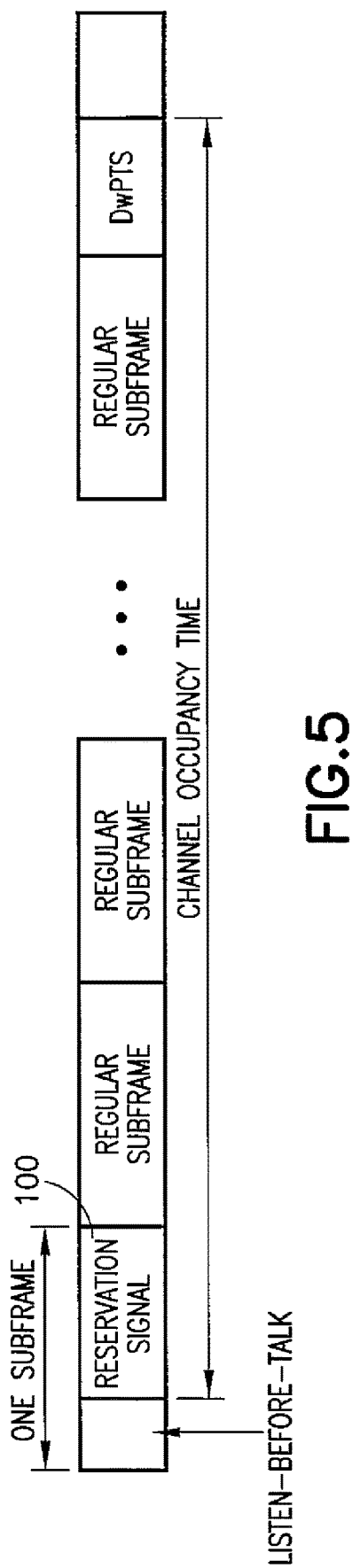
FIG. 5 is an example of a method for channel occupancy.

The base station 15 may sense the channel according LBE rules, such as EN 301893 for example, to determine whether the channel is occupied or not. Referring also to FIGS. 4-5, before a burst of DL transmission 20, the base station 15 first performs Listen-Before-Talk through a normal CCA, such as observing the operating channel(s) for at least 20 µs for example. For example, this may be the case when there have been no transmissions in the cell for a while, or an UL transmission has just ended. In other words, when there is no on-going eCCA procedure. If CCA is clear, the base station 15 may then start transmitting immediately. Depending on the CCA timing, the transmission from the base station 15 may involve also a Reservation Signal 100. For example, after a successful LBT/(e)CCA, the LTE LAA base station 15 can transmit the reservation signal 100 until the beginning of the next regular subframe (a fractional subframe), followed by zero, one or multiple regular subframes and potentially by a DwPTS subframe. The goal of Reservation signal 100 is to occupy the channel when it is found to be free based on LBT/(e)CCA.

If the channel is occupied according to CCA, the base station 15 may follow by performing eCCA. The base station 15 may select a random "N", and stores it in a counter, and checks if the operating channel is available, if the channel is available, decrements the counter by one, and when the counter reaches zero, the base station 15 transmits the Reservation Signal to occupy the channel and align the subframe timing. When the eCCA is clear, the base station 15 may transmit Reservation Signal to occupy the channel and align the subframe timing.

The base station 15 may also perform eCCA between consecutive bursts of DL transmissions for example in order to comply with regulatory rules on the maximum channel occupancy time.

When the operating channel is available, the LTE LAA base station 15 may transmit the Reservation Signal 100 until the beginning of the next regular subframe (PDSCH fractional subframe), followed by zero, one or multiple regular subframes and potentially by a DwPTS subframe. The UE 10 receives from the base station 15 the configuration for PDSCH fractional subframe reception. The UE 10 searches for DCI assigning PDSCH occupying fractional subframe. The UE receives PDSCH occupying fractional subframe. The DwPTS subframe at the end of DL burst may also be seen as another PDSCH fractional subframe for which UE receives configuration. The PDSCH fractional subframe configuration may be specific for each DL burst.

Uplink (UL) Operation

There may be a predefined Fixed Frame Period (FFP) defined for the UEs. FFP is a time resource made available for the UL transmissions. FFP has a predetermined length of preferably multiple of subframe(s) and a predetermined starting offset with respect to PCell timing and/or SCells Radio Frame timing. FFP periodicity may be different from PCell and/or SCells Radio Frame periodicity. FFP length may be less than (or equal to) the FFP periodicity. In an example embodiment, the FFP configuration is common for all the UEs in the cell. This ensures that UL transmissions can be synchronized within the LTE LAA cell. However, in another example embodiment FFP configuration is not common for all the UEs in the cell. Current Timing Advance procedure defined for LTE can be applied. In another example embodiment, the FFP configuration is common between LAA cells on a given carrier, or cells on adjacent LAA carriers in case the LAA cells are time synchronized. The FFP configuration defines the CCA timing for the UE 10. In particular, there is an opportunity for CCA at the end (or beginning) of each Fixed Frame Period (FFP).

As noted above, there is an opportunity for CCA at the end (or beginning) of each FFP. Hence, the CCA opportunity repeats with the FFP periodicity (such as 4 ms, 5 ms, or 10 ms for example). Fixed frame period consists of two portions:

1. Channel Occupancy Time. This provides Maximum scheduling time per FFP. The presence and the actual length of the current channel occupancy is up-to a scheduling decision of the base station 15.
2. Idle period at the end of FFP. This makes room for UEs' CCA and Rx-Tx switching. There is an opportunity for CCA of the UE 10 at each Idle period. The UE 10 may perform CCA only at the time of CCA opportunity, and only if it has a valid UL scheduling assignment for the first subframe in the following FFP.

Channel Occupancy Time (COT) is the time for the payload portion of the FFP, i.e. maximum UL scheduling time per FFP. COT is dimensioned according to rules defined for Frame Based Equipment (FBE). COT consists of N subframes and, optionally, a sub-subframe block or fractional subframe. Sub-subframe block may be seen as a shortened UL subframe at the end of Channel occupancy time. The goal of sub-subframe block is to maximize the duration of channel occupancy time within the limitations given by the regulator or it may be used on purpose by the network to provide CCA opportunities for its intended following DL transmission. The presence of the Channel Occupancy Time within a certain FFP is up to the eNB's scheduling decision. In other words, the base station 15 may not schedule any UL transmissions or a shorter UL transmission (less UL subframes) than possible by COT for a certain FFP. Instead, it may use the FFP for DL transmission or keep it empty for example. The actual length of the UL scheduling may depend on the scheduling decision by the base station. In other words, a number of subframes from the end of the channel occupancy may be left empty.

In one type of example embodiment the FFP configuration is used to define subframe types for a cell/area.

Subframes part of the UL FFP are fixed UL subframes, flexible subframes, fixed DL subframe or blank (empty) subframes.

Flexible subframes may be used for communication in either UL or DL direction. This may depend on a scheduling decision of the base station 15.

Blank subframes may be used if the base station 15 or the network decides to leave some subframes unused, such as periodically for example, to provide channel access opportunity for other systems.

UL Operation Based on FBE

Figure 9:
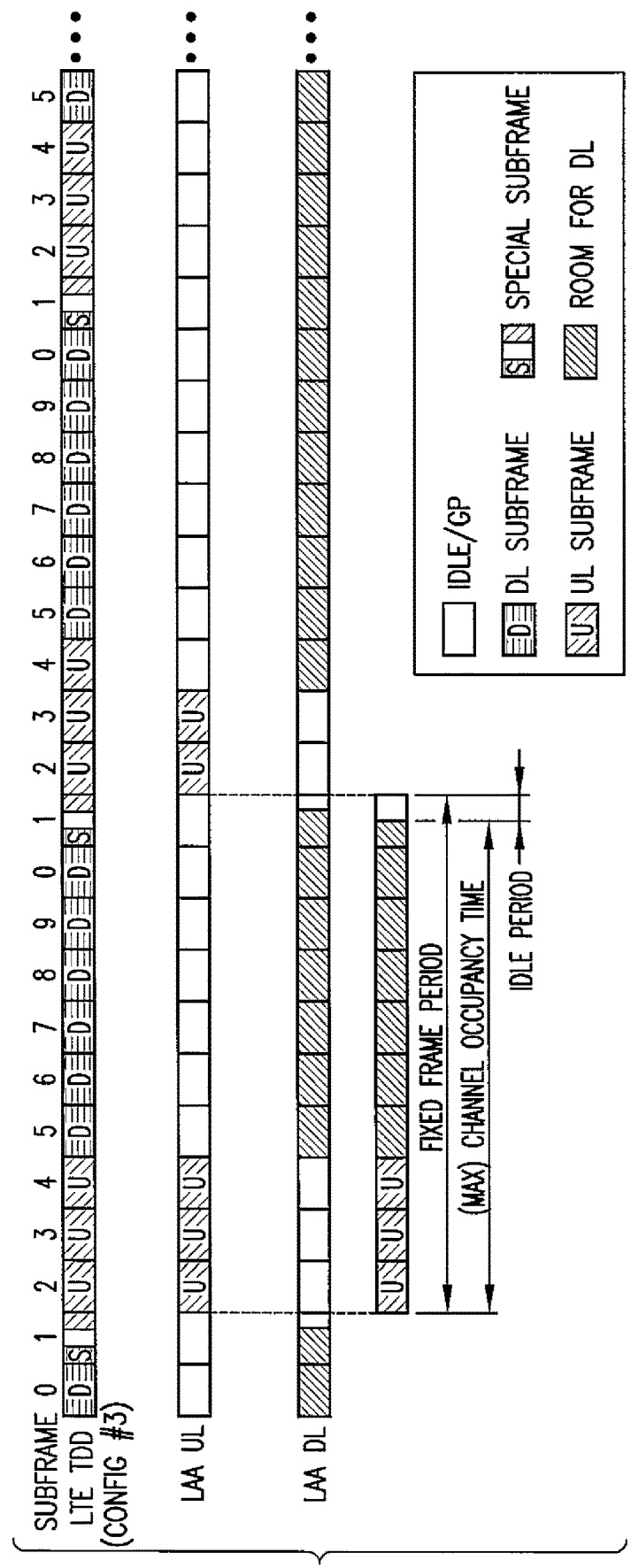
FIG. 9 is a diagram illustrating examples of downlink and uplink subframes and showing a Fixed frame period.

Referring also to FIG. 9, the FBE operation principle for LAA UL is shown with regard to a specific example embodiment. LTE TDD with UL-DL configuration #3 is used as a reference.

UE follows rules defined for FBE:

Fixed Frame Period is set to be 10 ms in the current example

Maximum Channel Occupancy Time consists of 9 full subframes+a fractional subframe with 7 OFDMA symbols.

Minimum Idle Period consists of 7 OFDMA symbols. Duration of the minimum Idle Period corresponds to 5.26% of the Channel Occupancy Time in order to comply with certain ETSI regulations.

LBT/CCA takes place at the end of the Idle Period (i.e. before the start of the subframe boundary)

Providing time for CCA and Tx/Rx switching

DL subframe preceding the first UL subframe contains GP to facilitate UEs' CCA measurement as well as Rx-Tx switching Timing Advance principle used in LTE TDD facilitates UE's Tx-Rx switching.

DwPTS or Special subframe can be used to provide this functionality

Figure 10:
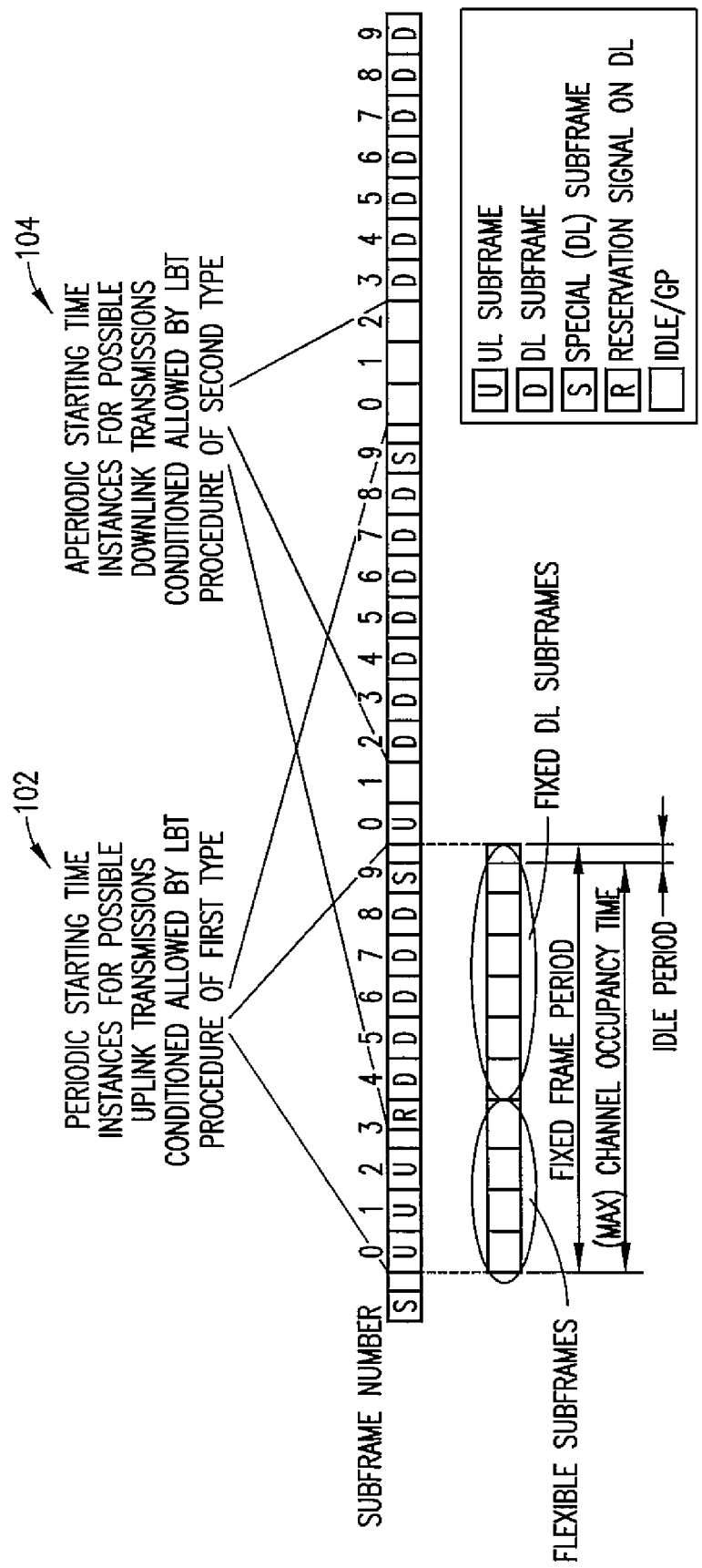
FIG. 10 is a diagram illustrating examples of downlink and uplink subframes and showing a Fixed frame period

FIG. 10 shows an example where periodic starting time instances 102 for possible uplink transmissions conditioned are allowed by LBT procedure of a first type, and where aperiodic starting time instances 104 for possible downlink transmissions conditioned are allowed by LBT procedure of a second type.

The base station 15 may configure the periodic CCA opportunities and the possible starting points of UL transmission to the UE 10. This is part of the FFP configuration. The CCA procedure may follow the rules of the first type of Listen Before Talk (LBT) procedure, such as the FBE rules in this example. The configuration can be made via higher layer signaling.

The UE 10 receives from the base station 15 the configuration of the periodic CCA opportunities according to the rules. For example, the UE shall perform CCA only when it has some pending UL transmission(s), scheduled transmissions according to UL grant, and periodic transmissions (SPS, SRS, CSI) (although PUCCH may not exist).

Referring back to FIG. 4, before transmission, the UE 10 only needs to perform CCA. After a successful CCA, the UE 10 can start UL transmission 22. UL transmissions 22 can typically only start at the beginning of a FFP (Short control signaling may be seen as an exception). The UL transmission may end before the end of Channel Occupancy Time of the FFP as scheduled by the base station 15. The base station 15 receives the UL transmissions according the eNB's scheduling, according to UL configuration for FFP and depending on the outcome CCA, following FBE rules. For example, the base station 15 uses these rules to determine UL reception timing with no uncertainty due to lack of eCCA on UL.

DL Operation Based on LBE

Figure 11:
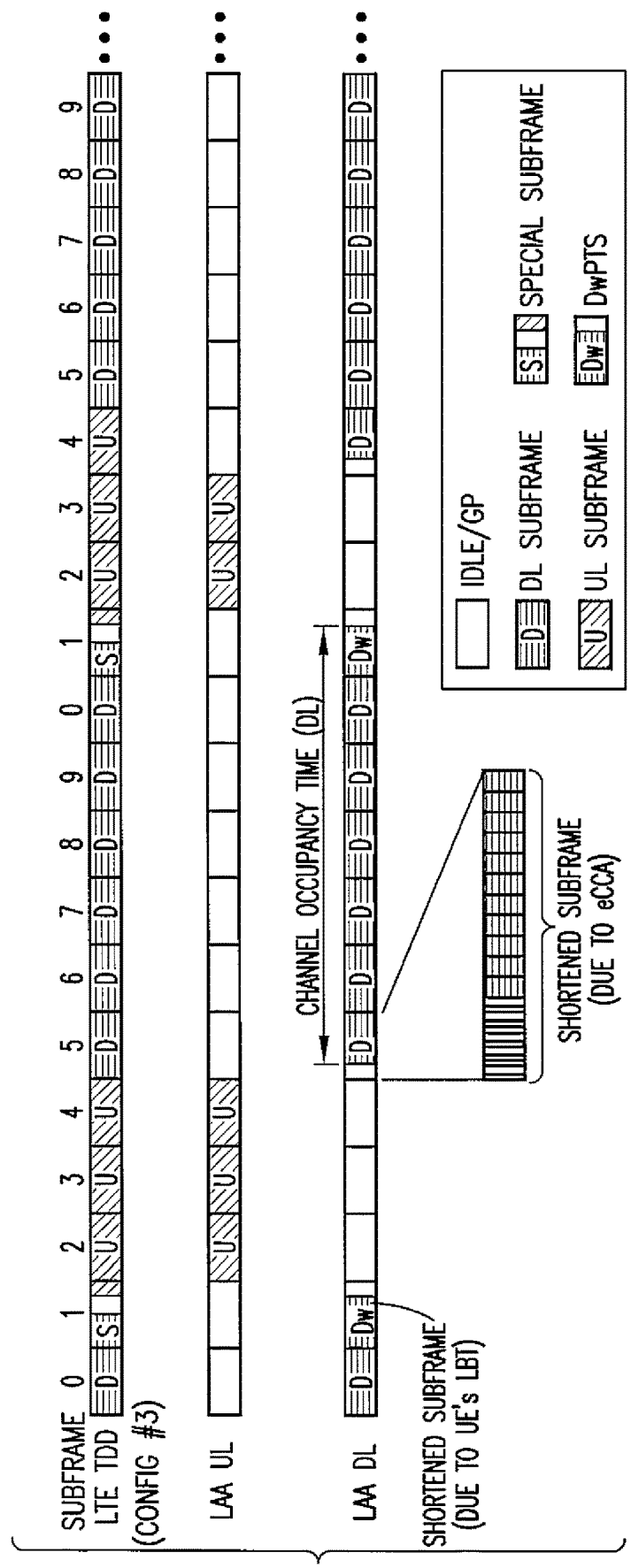
FIG. 11 is a diagram illustrating examples of downlink and uplink subframes and a shortened subframe.

FIG. 11 shows the LBE operation principle for LAA DL with regard to a specific example embodiment. Again, LTE TDD with UL-DL configuration #3 is used as a reference.

One of the basic features of LTE is synchronous UE operation combined with the predefined subframe structures. Furthermore, the considered LAA deployment scenario corresponds to LTE Carrier Aggregation where Scell(s) operating in unlicensed spectrum needs to be synchronized with PCell operating in licensed spectrum. For these reasons, and others, synchronous operation may be used with LBE.

Majority of subframes and related operations can be kept unchanged compared to LTE. However, there are certain specific subframes that needs to be considered in order to support LTE LAA based on rules defined for LBE:

a. The first DL subframe of in the Channel Occupancy time
  i. Due to BCCA-procedure, LBE operation needs to support variable starting timing of the transmission; DL Subframe shortened from the beginning.
b. The last DL subframe of the Channel Occupancy time
  i. DL subframe preceding the first UL subframe contains GP to facilitate UEs' CCA measurement as well as Rx-Tx switching; DL Subframe shortened from the end
  ii. Similar shortened or fractional DL subframe may be used to maximize the duration of DL channel occupancy time within limitations given by the regulator
  iii. DwPTS or Special subframe can be used to provide this functionality.

Fully Dynamic UL/DL Traffic Adaptation.

Figure 6:
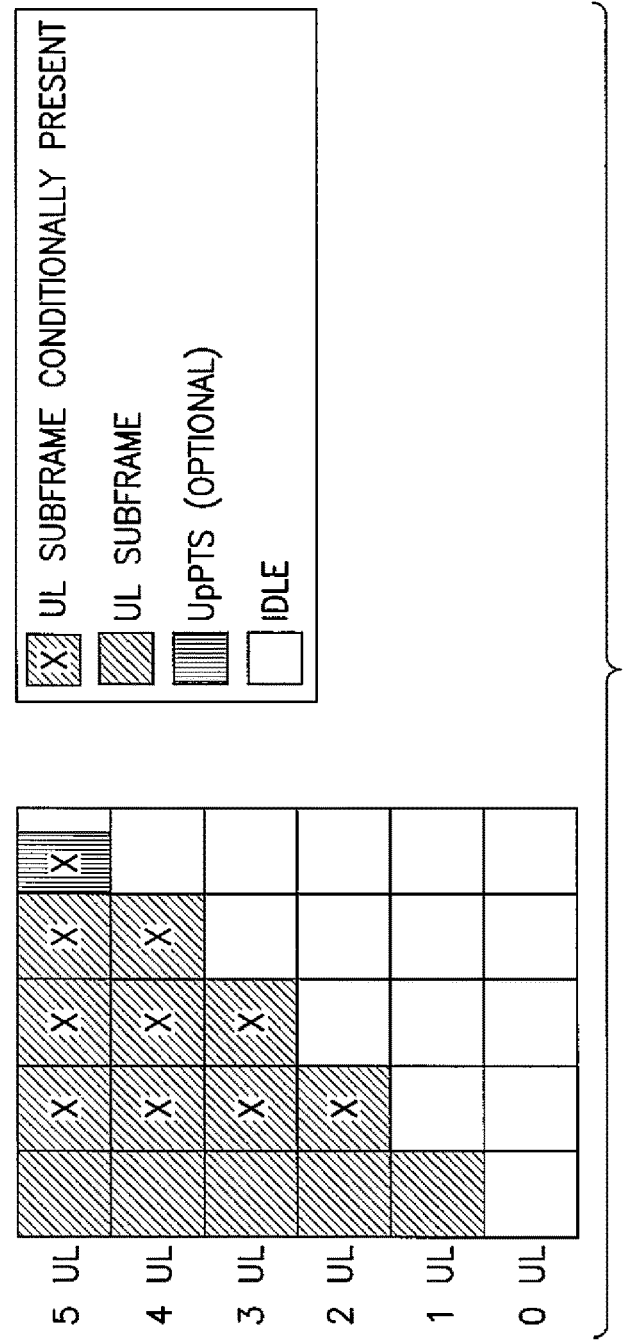
FIG. 6 is a diagram illustrating possible uplink scheduling options of a base station.

DL operation according to LBE definition/rules allows for fully dynamic selection of the UL/DL ratio based on instantaneous traffic conditions in the cell. The example shown in FIG. 6 illustrates one example of possible scheduling options of the base station 15 when Fixed Frame Period (defining UL operation according to rules defined for FBE) is configured to be 5 ms. It shows that UL portion can vary between 0% and 95% within the FFP. Duration of the Idle period maybe at least 5% of the Channel Occupancy Time. The base station 15 may decide the length of the UL portion. UL scheduling covers N consecutive subframes counted from the beginning of FFP. The base station 15 can start CCA/eCCA (related to LBE type of DL operation) right after the UL portion of all the scheduled UEs ends. The CCA (related to FBE type of UL operation) may be at the end of FFP or at the beginning of FFP. Some important parameters/aspects defining the FFP may be FFP length, FFP starting time, that the UL transmission can start only at the beginning of FFP, and that the length of the actual UL scheduling may depend on the eNB's scheduling decision.

Flexible LTE LAA Configuration

Figure 8:
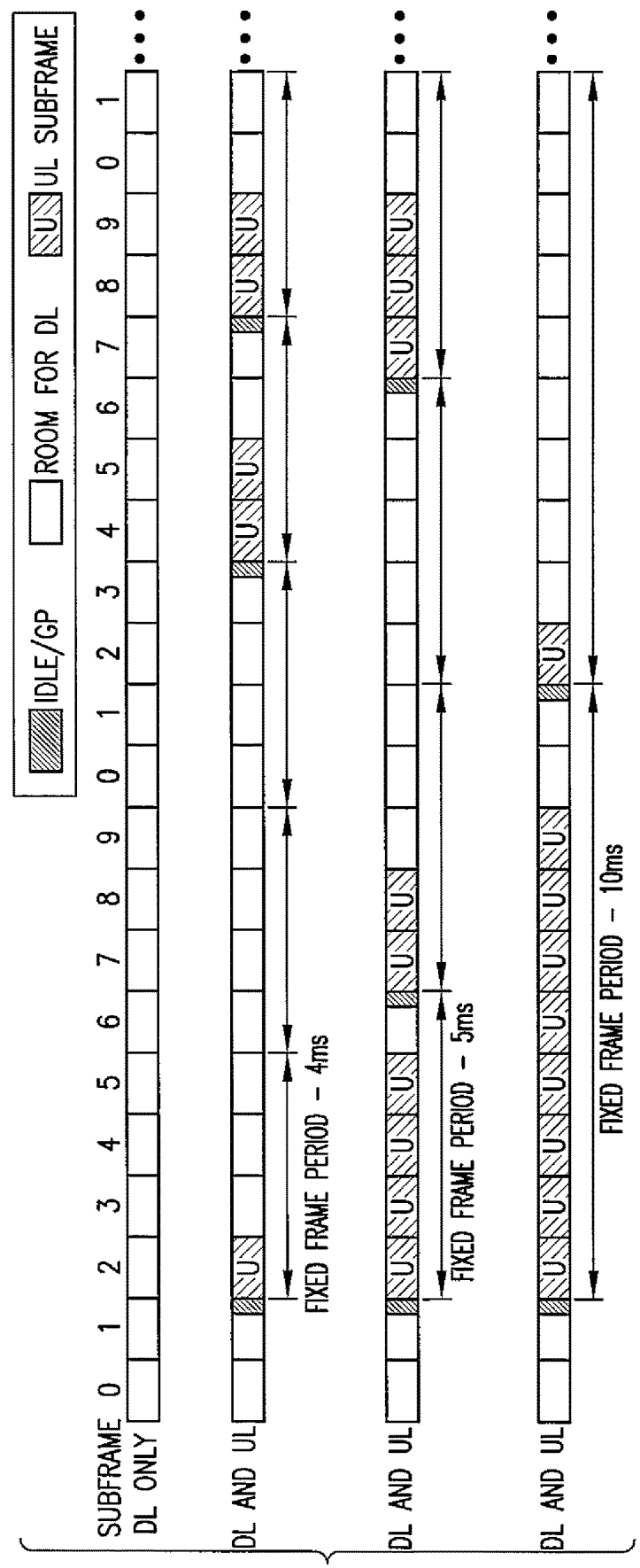
FIG. 8 is a diagram illustrating examples of downlink and uplink subframes.

Referring also to FIG. 8, examples are shown for LTE LAA to support configurable burst length and flexible UL/DL operation. FIG. 8 shows examples of the LTE LAA configurations and related scheduling decisions of the base station. LTE LAA may operate according to DL only scenario in the case when UL Fixed Frame period is not defined and the UL fixed frame period itself is not configured for the UE. The solution also supports fully dynamic UL/DL traffic adaptation. LTE LAA configuration can be used to facilitate eIMTA-type of interference coordination within LTE LAA network. The solution will also enable both phased introduction of LTE LAA UL functionality as well as supporting coexistence of coexistence of two UE categories, DL-only and UL and DL in the same cell.

It is quite straightforward to arrange LBT in the DL only scenario. However, in the case of TDD scenario some coordination between transmission and reception phases is needed:

eNB should not transmit at the time when an UE in the cell is performing LBT/CCA.
  UEs in the cell should not transmit when the eNB is performing LBT/CCA.

Furthermore, it should be taken into account that the support for TDD operation on the unlicensed band (i.e. UE supporting both UL and DL) may also be a UE category dependent feature. For that reason, LBT/CCA arrangement should be flexible enough to support coexistence of two UE categories, DL only and TDD (UL and DL) in the same LAA cell. This may provide an arrangement for flexible TDD (i.e. DL and UL) operation for LTE-Unlicensed based on LBT rules defined by ETSI for example.

With features as described herein, a system may be provided which facilitates fully flexible dynamic traffic adaptation on top of LTE LAA. The system may provide maximum opportunities for the base station to get the channel for DL operation, through using LBE type of operation for DL. Features facilitate FDMA in UL, through using FBE type of operation for UL. Features facilitate good interference coordination within LTE LAA networks. Features allow phased introduction of UL operation. Features supports DL only operation, supports UL only operation, and Supports simultaneous DL only and TDD (UL & DL) operation in the given cell.

Features as described herein may relate to an LTE-Advanced system, which may be part of 3GPP LTE Rel-13. More specifically, features as described herein may relate to LTE Unlicensed Bands operation (LTE Licensed Assisted Access, LTE LAA) and make an assumption that listen before talk (LBT) procedure is required for operation, such as based on European regulatory rules defined for 5 GHz ISM band for example.

Features as described herein may be used in order to provide fair coexistence between LTE and other technologies such as Wi-Fi as well as between LTE operators. Features may be used as a single global solution which enhances LTE to enable licensed-assisted access to unlicensed spectrum while coexisting with other technologies and fulfilling the regulatory requirements.

Features as described herein provide a way to minimize use of eCCA (and the need for reservation signal transmission) in LTE LAA while keeping the flexibility at maximum. This allows synchronized UL operation with LBT, provides maximum flexibility for dynamic UL/DL traffic adaptation, maintains scheduling role of the base station, and facilitates good interference coordination within LTE LAA network. It is also noted that different LTE LAA scenarios such as DL only and TDD (UL & DL) have slightly different requirements in terms of preferred mode of operation. For example, DL only operation does not support frequency domain multiple access from multiple network elements/UEs.

Figure 7:
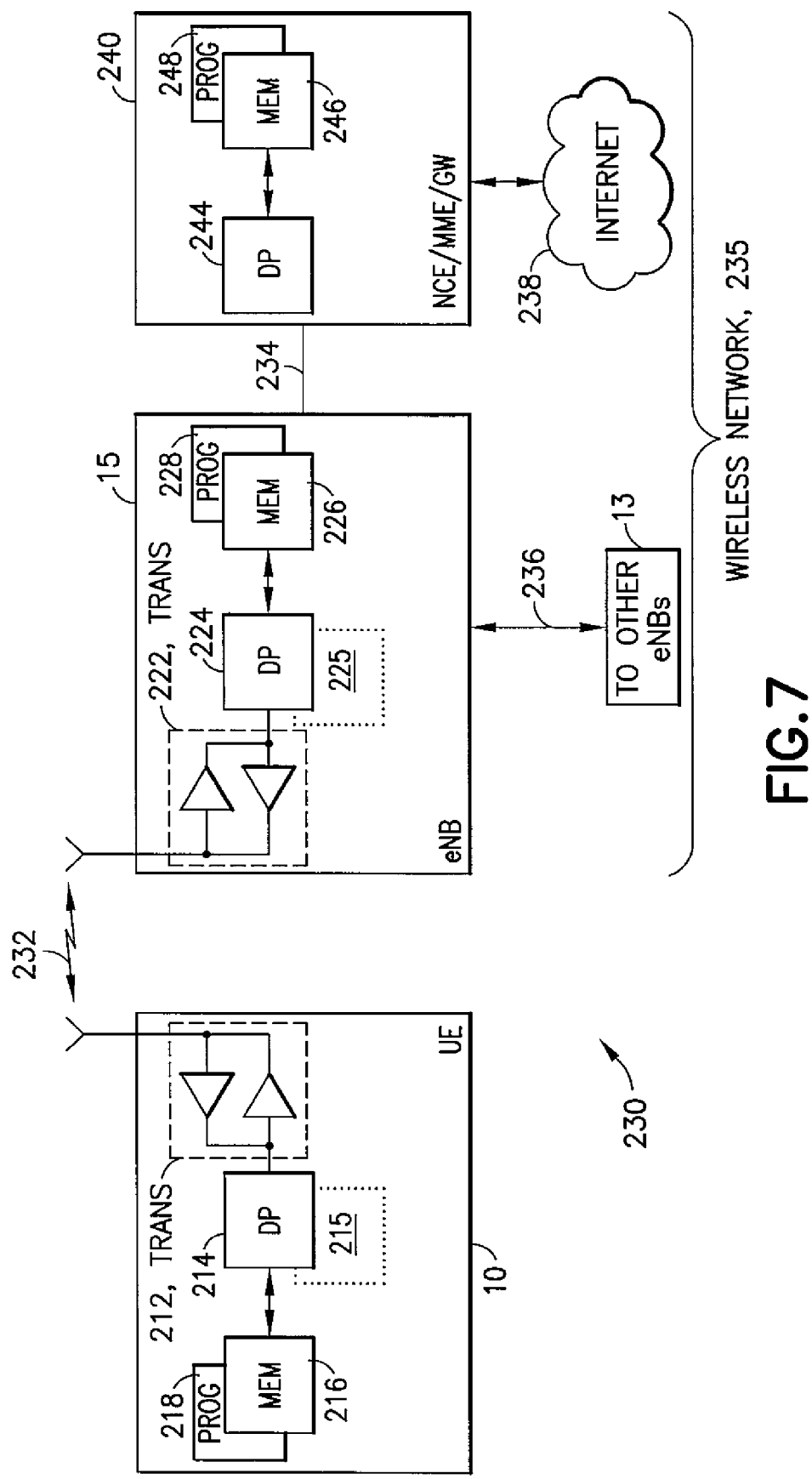
FIG. 7 is a diagram illustrating some components of the wireless system shown in FIGS. 1 and 2.

Referring also to FIG. 7, in the wireless system 230 a wireless network 235 is adapted for communication over a wireless link 232 with an apparatus, such as a mobile communication device which may be referred to as a UE 10, via a network access node, such as a Node B (base station), and more specifically the eNB 15. The network 235 may include a network control element (NCE) 240 that may include MME/S-GW functionality, and which provides connectivity with a network, such as a telephone network and/or a data communications network (e.g., the internet 238).

The UE 10 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 15 via one or more antennas.

The eNB 15 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 10 via one or more antennas. The eNB 15 is coupled via a data/control path 234 to the NCE 240. The path 234 may be implemented as an interface. The eNB 15 may also be coupled to another eNB via data/control path 236, which may be implemented as an interface.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments of this invention, as will be discussed below in greater detail. That is, various exemplary embodiments of this invention may be implemented at least in part by computer software executable by the DP 214 of the UE 10; by the DP 224 of the eNB 15; and/or by the DP 244 of the NCE 240, or by hardware, or by a combination of software and hardware (and firmware). Base station 13 may have the same type of components as the base station 15.

For the purposes of describing various exemplary embodiments in accordance with this invention the UE 10 and the eNB 15 may also include dedicated processors, for example RRC module 215 and a corresponding RRC module 225. RRC module 215 and RRC module 225 may be constructed so as to operate in accordance with various exemplary embodiments in accordance with this invention.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

Figure 12:
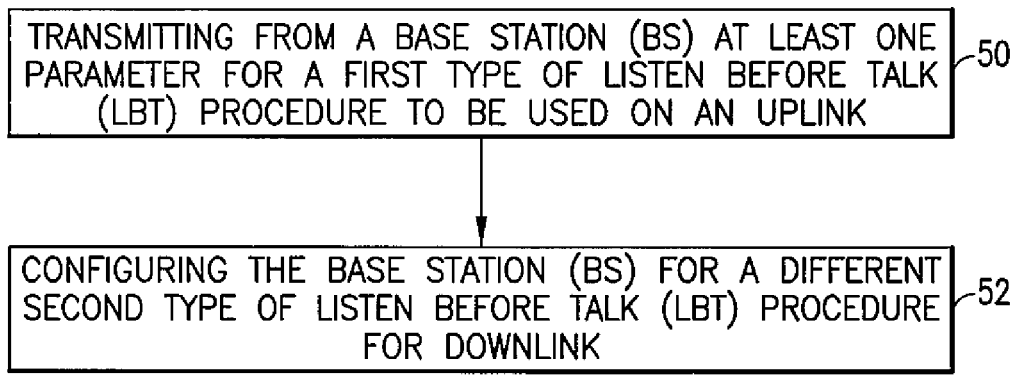
FIG. 12 is a diagram illustrating an example method.

Referring also to FIG. 12, an example method may comprise transmitting from a base station (BS) at least one parameter for a first type of Listen Before Talk (LBT) procedure to be used on an uplink (to be received by the base station) as indicated by block 50; and configuring the base station (BS) for a different second type of Listen Before Talk (LBT) procedure for downlink transmission from the base station (BS) as indicated by block 52.

Figure 13:
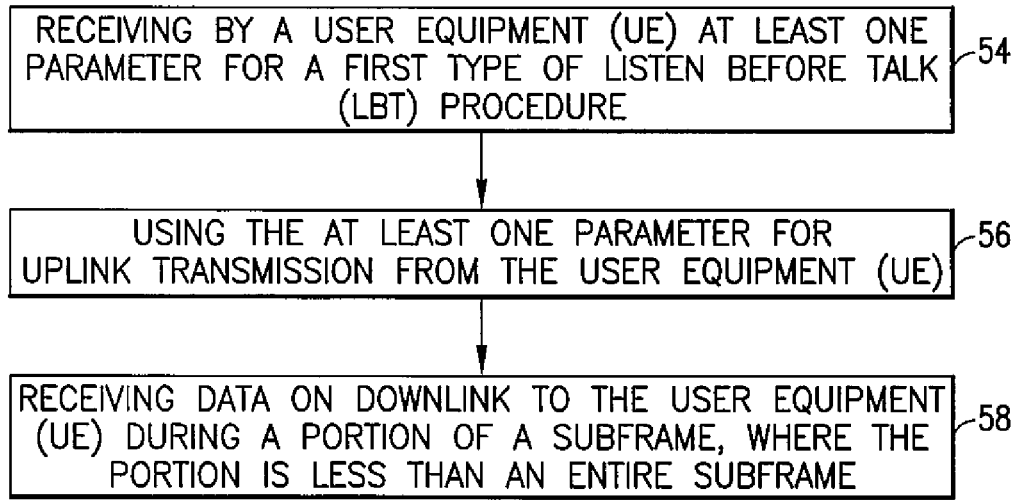
FIG. 13 is a diagram illustrating an example method.

Referring also to FIG. 13, an example method may comprise receiving by a User Equipment (UE) at least one parameter for a first type of Listen Before Talk (LBT) procedure as indicated by block 54, using the at least one parameter for uplink transmission from the User Equipment (UE) as indicated by block 56, and receiving data on downlink to the User Equipment (UE) during a portion of a subframe, where the portion is less than an entire subframe as indicated by block 58.

An example method may comprise transmitting from a base station (BS) at least one parameter for a first type of listen before talk (LBT) procedure to be used for uplink to be received by the base station; and configuring the base station (BS) for a different second type of listen before talk (LBT) procedure for downlink from the base station (BS). The first type of listen before talk (LBT) procedure may be a procedure that allows transmission to start when at least one channel is assessed to be unoccupied at at least one periodic time instance. The second type of listen before talk (LBT) procedure may be a procedure that allows transmission to start when at least one channel is assessed to be unoccupied at at least one time instance that is not periodic. The at least one parameter may comprise information regarding one or more of the following: timing of periodic uplink transmission opportunities, length of fixed frame period, maximum length of a periodic uplink transmission opportunity, length of idle period, length of uplink-downlink (UL-DL) switching gap, possible starting time for uplink (UL) transmission. The at least one parameter may define subframe type for one or more subframes and for one or more cells, wherein the subframe types include at least one of fixed uplink subframe, flexible subframe, unused subframe, and fixed downlink subframe. Configuring the base station (BS) may comprise configuring at least one subframe as a fixed uplink (UL) subframe. The base station (BS) might not utilize the fixed uplink (UL) subframe for downlink (DL), and the base station (BS) second type of listen before talk (LBT) procedure may be suspended during the fixed uplink (UL) subframe. Configuring the base station (BS) may comprise configuring at least one subframe to be used as a flexible subframe, which is used as an uplink (UL) subframe or a downlink (DL) subframe. Configuring the base station (BS) may comprise one or more of the following: the flexible subframe being part of a Channel Occupancy Time (COT) defined for uplink (UL) operation, scheduling of the base station defining whether the subframe is used as an uplink (UL) or a downlink (DL) subframe or is left unused, and suspending the second type of listen before talk (LBT) procedure during a subframe scheduled as an uplink (UL) subframe.

The first type of listen before talk (LBT) procedure for the uplink and second type of listen before talk (LBT) procedure for the downlink may be applied on a same carrier. The at least one parameter may be transmitted in downlink from the base station (BS) on which no listen before talk (LBT) procedure is applied. Transmitting the at least one parameter may be on a first carrier, and where the uplink is on a second different carrier. The first carrier may be in a primary cell and the uplink may be in a secondary cell.

An example apparatus 15 may be provided comprising at least one processor; and at least one non-transitory memory including computer program code, the at least one memory and the computer program code configured to, with the at least one processor, cause the apparatus to: transmit from the apparatus at least one parameter for a first type of listen before talk (LBT) procedure to be used for uplink to be received by the apparatus; and configure the apparatus for a different second type of listen before talk (LBT) procedure for downlink from the apparatus.

The first type of listen before talk (LBT) procedure may be a procedure that allows transmission to start when at least one channel is assessed to be unoccupied at least one periodic time instance. The second type of listen before talk (LBT) procedure may be a procedure that allows transmission to start when at least one channel is assessed to be unoccupied at least one time instance that is not periodic. The at least one parameter may comprise information regarding at least one periodic uplink transmission opportunity. The apparatus may comprise configuring at least one subframe as a fixed uplink (UL) subframe. The at least one non-transitory memory and the at least one processor may be configured to cause the apparatus to not utilize the fixed uplink (UL) subframe for downlink (DL), and the second type of listen before talk (LBT) procedure being suspended during the fixed uplink (UL) subframe. Configuring the apparatus may comprise configuring at least one subframe to be used as a flexible subframe, which is used as an uplink (UL) subframe or a downlink (DL) subframe. Configuring the apparatus comprises one or more of the following: the flexible subframe being part of a Channel Occupancy Time (COT) defined for uplink (UL) operation, scheduling of the apparatus defining whether the subframe is used as a uplink (UL) or downlink (DL) subframe, and suspending the second type of listen before talk (LBT) procedure during a subframe scheduled as an uplink (UL) subframe. The at least one non-transitory memory and the at least one processor may be configured to cause the apparatus to have the first type of listen before talk (LBT) procedure for the uplink and second type of listen before talk (LBT) procedure for the downlink be applied on a same carrier. The at least one non-transitory memory and the at least one processor may be configured to cause the apparatus to transmit the at least one parameter in downlink from the base station (BS) on which no listen before talk (LBT) procedure is applied. The at least one parameter may be on a first carrier, and where the uplink is on a second different carrier. The first carrier may be in a primary cell and the uplink is in a secondary cell. The at least one parameter may comprise information regarding one or more of the following: timing of periodic uplink transmission opportunities, length of fixed frame period, maximum length of a periodic uplink transmission opportunity, length of idle period, length of uplink-downlink (UL-DL) switching gap, possible starting time for uplink (UL) transmission. The at least one non-transitory memory and the at least one processor may be configured to cause the apparatus to use the at least one parameter to define subframe type for one or more subframes and for one or more cells, wherein the subframe types include at least one of fixed uplink subframe, flexible subframe, unused subframe, and fixed downlink subframe.

An example embodiment may be provided in a non-transitory program storage device, such as 226 for example, readable by a machine such as 15 for example, tangibly embodying a program of instructions executable by the machine for performing operations, the operations comprising: transmitting from a base station (BS) at least one parameter for a first type of listen before talk (LBT) procedure to be used for uplink to be received by the base station (BS); and configuring the base station (BS) for a different second type of listen before talk (LBT) procedure for downlink from the base station (BS).

An example embodiment may use a method comprising receiving by a User Equipment (UE) 10 at least one parameter for a first type of listen before talk (LBT) procedure; using the at least one parameter for uplink transmission from the User Equipment (UE); and receiving data on downlink to the User Equipment (UE) during a portion of a subframe, where the portion is less than an entire subframe. The first type of listen before talk (LBT) procedure may be a procedure that allows transmission to start when at least one channel is assessed to be unoccupied at at least one periodic time instance. The at least one parameter may comprise information regarding one or more of the following: timing of periodic uplink transmission opportunities, length of fixed frame period, maximum length of a periodic uplink transmission opportunity, length of idle period, length of uplink-downlink (UL-DL) switching gap, possible starting time for uplink (UL) transmission. A dimension(s) of the portion of the subframe containing downlink data may be received as part of a Physical Downlink Shared Channel (PDSCH) assignment Downlink Control Information (DCI), or by a separate DCI targeted to multiple UEs and carried on a Physical Downlink Control Channel (PDCCH) Common Search Space (CSS), or by UE-specific Radio Resource Control (RRC) signaling, or by cell-specific RRC signaling. The portion of the subframe may end at a start of a next following subframe; and the method may comprise receiving an assignment for the downlink data on the portion of the subframe comprising receiving the assignment on the next following subframe. The at least one parameter may be received in downlink from a base station (BS) on which no listen before talk (LBT) procedure is applied.

An example apparatus, such as 10 for example, may comprise at least one processor; and at least one non-transitory memory including computer program code, the at least one memory and the computer program code configured to, with the at least one processor, cause the apparatus to: receive by the apparatus at least one parameter for a first type of listen before talk (LBT) procedure; use the at least one parameter for uplink transmission from the apparatus; and receive data on downlink to the apparatus during a portion of a subframe, where the portion is less than an entire subframe.

The first type of listen before talk (LBT) procedure may be a procedure that allows transmission to start when at least one channel is assessed to be unoccupied at at least one periodic time instance. The at least one parameter may comprise information regarding one or more of the following: timing of periodic uplink transmission opportunities, length of fixed frame period, maximum length of a periodic uplink transmission opportunity, length of idle period, length of uplink-downlink (UL-DL) switching gap, possible starting time for uplink (UL) transmission. The at least one non-transitory memory and the at least one processor may be configured to cause the apparatus to receive a dimension(s) of the portion of the subframe containing downlink data as part of a Physical Downlink Shared Channel (PDSCH) assignment Downlink Control Information (DCI), or by a separate DCI targeted to multiple UEs and carried on a Physical Downlink Control Channel (PDCCH) Common Search Space (CSS), or by UE-specific Radio Resource Control (RRC) signaling, or by cell-specific RRC signaling. The at least one non-transitory memory and the at least one processor may be configured for: the portion of the subframe to end at a start of a next following subframe; and receiving an assignment for the downlink data on the portion of the subframe comprising receiving the assignment on the next following subframe. The at least one non-transitory memory and the at least one processor may be configured to receive the at least one parameter in downlink from a base station (BS) on which no listen before talk (LET) procedure is applied.

An example embodiment may be provided in a non-transitory program storage device, such as 216 for example, readable by a machine, such as 10 for example, tangibly embodying a program of instructions executable by the machine for performing operations, the operations comprising: receiving by a User Equipment (UE) at least one parameter for a first type of listen before talk (LBT) procedure; using the at least one parameter for uplink transmission from the User Equipment (UE); and receiving data on downlink to the User Equipment (UE) during a portion of a subframe, where the portion is less than an entire subframe.

An embodiment may be provided in an apparatus comprising means for transmitting from an apparatus at least one parameter for a first type of listen before talk (LBT) procedure to be used for uplink to be received by the apparatus; and means for configuring the apparatus for a different second type of listen before talk (LBT) procedure for downlink from the apparatus.

An embodiment may be provided in an apparatus comprising means for receiving by the apparatus at least one parameter for a first type of listen before talk (LBT) procedure; means for using the at least one parameter for uplink transmission from the apparatus; and means for receiving data on downlink to the apparatus during a portion of a subframe, where the portion is less than an entire subframe.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Even though the examples above have been described from the viewpoint of LAA, features as described herein are equally valid for other co-existence scenarios. For example, Licensed Shared Access (LSA) is an example of such a scenario. LSA is a spectrum sharing concept enabling access to spectrum that is identified for International Mobile Telecommunications (IMT), but not cleared for IMT deployment. Co-primary sharing is another example. Co-primary sharing refers to spectrum sharing where several primary users (operators) share the spectrum dynamically or semi-statically. This may be used for small cells at 3.5 GHz for example. Spectrum sharing between operators will happen if regulators force it and/or operators need it. Thus, features as described herein are also applicable to LSA and Co-primary sharing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method, comprising:
   transmitting from a base station at least one parameter for a first type of listen before talk procedure to be used for uplink to be received by the base station;
   configuring the base station for a different second type of listen before talk procedure for downlink from the base station, wherein the second type of listen before talk procedure comprises a procedure that allows transmission to start when at least one channel is assessed to be unoccupied at at least one time instance that is not periodic; and
   transmitting a dimension(s) of a portion of the subframe containing downlink data as part of a physical downlink shared channel assignment downlink control information, or by a separate downlink control information targeted to multiple user equipments, or by user equipment-specific radio resource control signaling, or by cell-specific radio resource control signaling,
   wherein the at least one parameter comprises information regarding at least a possible starting time for uplink transmission.

2. The method of claim 1, wherein the at least one parameter further comprises information regarding one or more of the following: timing of periodic uplink transmission opportunities, length of fixed frame period, maximum length of a periodic uplink transmission opportunity, length of idle period, length of uplink-downlink switching gap.

3. The method of claim 1, wherein the first type of listen before talk procedure for the uplink and second type of listen before talk procedure for the downlink are applied on a same carrier.

4. The method of claim 1, wherein the at least one parameter is transmitted in downlink from the base station on which no listen before talk procedure is applied.

5. The method of claim 1, wherein transmitting the at least one parameter is on a first carrier, and where the uplink is on a second different carrier.

6. An apparatus comprising:
   at least one processor; and
   at least one memory including computer program code, the at least one memory and the computer program code configured to, with the at least one processor, cause the apparatus to:
   transmit from the apparatus at least one parameter for a first type of listen before talk procedure to be used for uplink to be received by the apparatus; and
   configure the apparatus for a different second type of listen before talk procedure for downlink from the apparatus, wherein the second type of listen before talk procedure comprises a procedure that allows transmission to start when at least one channel is assessed to be unoccupied at at least one time instance that is not periodic; and
   transmit a dimension(s) of a portion of the subframe containing downlink data as part of a physical downlink shared channel assignment downlink control information, or by a separate downlink control information targeted to multiple user equipments, or by user equipment-specific radio resource control signaling, or by cell-specific radio resource control signaling, and wherein the at least one parameter comprises information regarding at least a possible starting time for uplink transmission.

7. The apparatus of claim 6, wherein the at least one parameter comprises information regarding at least one periodic uplink transmission opportunity.

8. The apparatus of claim 6, wherein configuring the apparatus comprises configuring at least one subframe as a fixed uplink subframe.

9. The apparatus of claim 8, wherein the at least one non-transitory memory and the at least one processor are further configured to cause the apparatus to not utilize the fixed uplink subframe for downlink, and the second type of listen before talk procedure being suspended during the fixed uplink subframe.

10. The apparatus of claim 6, wherein configuring the apparatus comprises configuring at least one subframe to be used as a flexible subframe, which is used as an uplink subframe or a downlink subframe.

11. The apparatus of claim 6, wherein the at least one non-transitory memory and the at least one processor are further configured to cause the apparatus to have the first type of listen before talk procedure for the uplink and second type of listen before talk procedure for the downlink be applied on a same carrier.

12. The apparatus of claim 6, wherein the at least one non-transitory memory and the at least one processor are further configured to cause the apparatus to transmit the at least one parameter in downlink from the base station on which no listen before talk procedure is applied.

13. The apparatus of claim 12, wherein the at least one parameter is transmitted on a first carrier, and where the uplink is on a second different carrier.

14. The apparatus of claim 6, wherein the at least one parameter further comprises information regarding one or more of the following: timing of periodic uplink transmission opportunities, length of fixed frame period, maximum length of a periodic uplink transmission opportunity, length of idle period, length of uplink-downlink switching gap.

15. A method, comprising:
receiving by a user equipment at least one parameter for a first type of listen before talk procedure, wherein the at least one parameter comprises information regarding at least a possible starting time for uplink transmission;
using the at least one parameter for uplink transmission from the user equipment;
receiving data on downlink to the user equipment during a portion of a subframe from a base station using a second type of listen before talk procedure, where the portion is less than an entire subframe, wherein the second type of listen before talk procedure comprises a procedure that allows transmission to start when at least one channel is assessed to be unoccupied at at least one time instance that is not periodic; and
receiving a dimension(s) of the portion of the subframe containing downlink data as part of a physical downlink shared channel assignment downlink control information, or by a separate downlink control information targeted to multiple user equipments, or by user equipment-specific radio resource control signaling, or by cell-specific radio resource control signaling.

16. The method of claim 15, wherein the at least one parameter further comprises information regarding one or more of the following: timing of periodic uplink transmission opportunities, length of fixed frame period, maximum length of a periodic uplink transmission opportunity, length of idle period, length of uplink-downlink switching gap.

17. An apparatus, comprising:
at least one processor; and
at least one non-transitory memory including computer program code, the at least one memory and the computer program code configured to, with the at least one processor, cause the apparatus to:
receive by the apparatus at least one parameter for a first type of listen before talk procedure, wherein the at least one parameter comprises information regarding at least a possible starting time for uplink transmission;
use the at least one parameter for uplink transmission from the apparatus;
receive data on downlink to the apparatus during a portion of a subframe from a base station using a second type of listen before talk procedure, where the portion is less than an entire subframe, wherein the second type of listen before talk procedure comprises a procedure that allows transmission to start when at least one channel is assessed to be unoccupied at at least one time instance that is not periodic; and
receive a dimension(s) of the portion of the subframe containing downlink data as part of a physical downlink shared channel assignment downlink control information, or by a separate downlink control information targeted to multiple user equipments, or by user equipment-specific radio resource control signaling, or by cell-specific radio resource control signaling.

18. The apparatus of claim 17, wherein the at least one parameter further comprises information regarding one or more of the following: timing of periodic uplink transmission opportunities, length of fixed frame period, maximum length of a periodic uplink transmission opportunity, length of idle period, length of uplink-downlink switching gap.

19. The apparatus of claim 17, wherein t the dimension(s) of the portion of the subframe containing downlink data are received by a separate downlink control information targeted to multiple user equipments and carried on a physical downlink control channel common search space.

20. The apparatus of claim 17, wherein the at least one non-transitory memory and the at least one processor are further configured to receive the at least one parameter in downlink from a base station on which no listen before talk procedure is applied.

* * * * *